United States Patent [19]

Sweeny et al.

[11] Patent Number: 4,822,126

[45] Date of Patent: Apr. 18, 1989

[54] WAVELENGTH INDEPENDENT COUPLER AND METHOD OF MANUFACTURE THEREOF

[75] Inventors: Kevin L. Sweeny; Michael Corke, both of Wheaton; Kevin M. Schmidt, Schiller, all of Ill.

[73] Assignee: Amphenol Corporation, Wallingford, Conn.

[21] Appl. No.: 53,292

[22] Filed: May 21, 1987

[51] Int. Cl.$^4$ ............................ G02B 6/26; G02B 6/02
[52] U.S. Cl. ................................ 350/96.15; 350/96.29
[58] Field of Search ............... 350/96.10, 96.15, 96.16, 350/96.29, 96.30, 96.31, 96.32, 96.33

[56] References Cited

U.S. PATENT DOCUMENTS

| | | | |
|---|---|---|---|
| 4,201,447 | 5/1980 | Thompson et al. | 350/96.15 X |
| 4,229,067 | 10/1980 | Love | 350/96.15 |
| 4,342,499 | 8/1982 | Hicks, Jr. | 350/96.29 X |
| 4,385,802 | 5/1983 | Blaszyk et al. | 350/96.33 |
| 4,392,712 | 7/1983 | Ozeki | 350/96.15 X |
| 4,474,431 | 10/1984 | Bricheno | 350/96.15 |
| 4,490,163 | 12/1984 | Jochem et al. | 350/96.15 X |
| 4,586,784 | 5/1986 | Tremblay et al. | 350/96.15 |
| 4,632,513 | 12/1986 | Stowe et al. | 350/96.15 X |

OTHER PUBLICATIONS

Electronics Letters, "Novel Method for Characterisation of Single-Mode Fibers and Prediction of Crossover Wavelength and Bandpass in Nonidentical Fibre Directional Couplers", Jul. 17, 1986, vol. 22, No. 15.

FOREIGN PATENT DOCUMENTS

| | | | |
|---|---|---|---|
| 2922938 | 12/1980 | Fed. Rep. of Germany | 5/17 X |
| 0069054 | 1/1983 | European Pat. Org. | 7/26 X |
| 84/04822 | 12/1984 | World Intellectual Property Org. | 5/17Z |
| 60-57303 | 4/1985 | Japan | 6/28 X |

Applied Optics, Vol. 22, No. 12, June 1983, New York, pp. 1918-1922; J. Bures et al.: "Analyse d un copleur bidirectionnel a fibres optiques monomodes fusionnes."

Primary Examiner—William L. Sikes
Assistant Examiner—Akm E. Ullah
Attorney, Agent, or Firm—Bacon & Thomas

[57] ABSTRACT

The invention relates to a single mode fiber optic coupler which is wavelength independent and a method of manufacture thereof. The coupler comprises two single mode fibers positioned side by side which are fused in a manner such that they taper down into a substantially circular cross section coupling region wherein the two cores of the fibers run therethrough. In its most preferred aspect to achieve wavelength independence, the fibers are selected to have indexes of refraction at the core which are sufficiently different such that uniform coupling throughout a broad range of light wavelengths is achieved.

18 Claims, 8 Drawing Sheets

WAVELENGTH INDEPENDENT COUPLER AND METHOD OF MANUFACTURE THEREOF

BACKGROUND OF THE INVENTION

This invention relates to a single mode optical fiber coupler capable of effecting substantially uniform coupling of light across a predetermined relatively broad range of wavelengths, as well as relating to the method of manufacture thereof.

It is desirable to employ single mode waveguides and coupling devices therefor because a straight-forward light path is provided therein. Hereinafter the terms "waveguide" and "fiber" shall be used interchangeably and refers to the core of the fiber surrounded by its cladding. A single mode waveguide or fiber is understood to be a waveguide which conducts or can conduct only a single mode of light. Typically, these waveguides are glass fibers which are very small in diameter. Further, the size of the core of these fibers is on the order of 5-10 microns or less. This compares with the relatively large core size of multimode fibers which are typically on the order of at least 50 microns and typically about 50-200 microns. Accordingly, it can be appreciated that the manufacture of couplers for single mode fibers is a difficult undertaking since, because of the relatively small fiber size, it is relatively easy to destroy the waveguide path or core and/or detrimentally affect it resulting in increased losses in transmission, the result of which is highly undesirable in the case of single mode fibers.

In accordance with the disclosure of copending application Ser. No. 833,635 now abandoned of Paul Kopera et al., which disclosure is specifically incorporated by reference herein, there is disclosed a method of making single mode fiber optic couplers. Typically, the fiber optic couplers disclosed therein are those of which are known as wavelength dependent fiber optic couplers. More specifically, by wavelength dependent is meant that the single mode couplers will operate to effect substantially uniform coupling between two fibers at very specific wavelengths, however, the results will be affected detrimentally if the wavelength of the light being employed is varied from the specifically desired wavelength.

In the field of fiber optics, there are three wavelengths ranges upon which coupling across the board range must be effected. The first length is typically between about 1200 nm-1500 nm. This range is of special interest in present technology because it is employed in long haul communications. The other ranges are typically between 700-900 nm and 400-600 nm.

In the prior art, it has been desirable to make fused single mode couplers which are wavelength independent, such that a number of different wavelengths can be transmitted through the fiber with little or no loss over a broad range. For a discussion of wavelength dependence of fused couplers, see Electronics Letters, Mar. 13, 1986, volume 22, Number 6 "Wavelength Dependence of Fused Couplers".

In the past, there have been devised several schemes for fabricating fused couplers which yield devices having splitting ratios substantially independent of wavelength. One such scheme is discussed in Electronics Letters, Aug. 15, 1985, volume 21, No. 17 "Wavelength-Flattened Fused Couplers". In this document, there is discussed a technique for fabricating fused couplers which yields devices having splitting ratios substantially independent of wavelength. The couplers are fabricated by using fibers of different diameter or profile, or by tapering one of two identical fibers more than the other. The devices are made by pretapering one fiber and then the tapered fibers were twisted with untapered fiber of constant diameter and the pairs heated and pulled to cause the fusing. A disadvantage with this process, however, is that it is difficult to taper one fiber and then hold the two fibers together to fuse since the fibers are fragile and can break. Further, because of the buffer on the fibers at the portions which are being held, there is a slippage effect and thus, reproducabilities with the process becomes difficult.

SUMMARY OF THE INVENTION

In accordance with the invention, an improvement in a single mode coupler is provided. The single mode coupler is of the type wherein two single mode fibers are fused together to form a coupler which permits substantially uniform coupling of light over a predetermined frequency range of light between the two fibers. The improvement in accordance with the invention is to provide a wavelength independent coupler.

Wavelength independence is provided by having the fibers selected to have cores with respective indexes of refraction, one different from the other, with the difference being sufficient such that when the fibers are fused together as a coupler, substantially uniform coupling of light over a predetermined frequency range between the two fibers is achieved.

In a more specific aspect, partial etching of the cladding surrounding the fiber cores can be performed and then the fibers are heated to be fused, and are simultaneously stretched to achieve the resultant wavelength independent coupler.

Alternatively, instead of etching, the taper profile can be modified during fabrication to achieve results similar to those with etching.

In another aspect, the improvement in accordance with the invention relates to a method of making a single mode coupler of the type discussed above. The steps of the method include positioning predetermined portions of the two single mode fibers together such that their claddings are in contact, heating the fibers with a heat source over a predetermined portion thereof and moving the predetermined portions in a reciprocal motion across and in proximity to the heat source to cause the predetermined portions of the fibers to fuse together.

Axial tension is applied to the fused region to taper down from individual fibers into a reduced diameter region of predetermined shape wherein the fibers are fused into a unitary region. The improvement lies in that the fibers being fused are selected to have cores with respective different indexes of refraction, one different from the other, with the difference being sufficient such that when the fibers are fused together as a coupler there results a coupler capable of uniformly coupling light over a predetermined frequency range between the two fibers.

Although the wavelength independence is achieved, as contemplated herein, by having the cores of different indices of refraction, it is contemplated that similar results could be achieved by keeping the cores at the like indeces of refraction and making the claddings one different from the other with respect to indeces of refraction.

BRIEF DESCRIPTION OF THE DRAWINGS

Having briefly described the invention, the features and other advantages of the invention will become more readily apparent from the detailed description set forth hereinafter made with reference to the attached drawings, wherein:

FIGS. 9a-10b are schematic views of coupler taper and corresponding graphs illustrating coupling distribution achieved with respective tapers demonstrating optical performance achieved.

DETAILED DISCUSSION OF THE INVENTION

Figure 1:
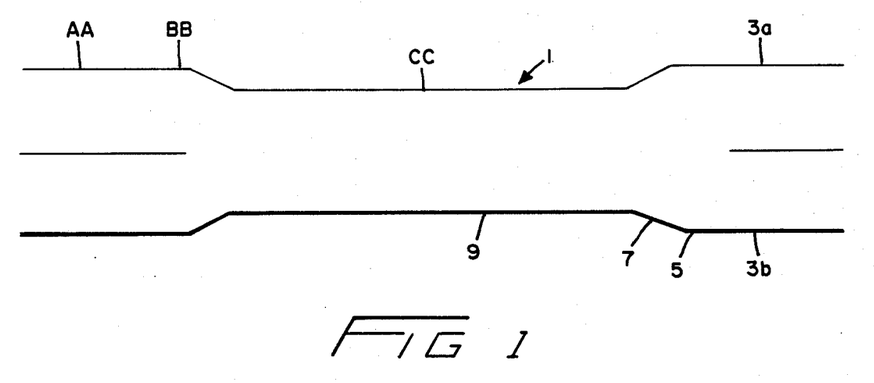
FIG. 1 is a schematic side view of the coupler in accordance with the invention.

The single mode coupler, which is wavelength independent, in accordance with the invention, is generally illustrated in FIG. 1. As can be seen therein, the coupler 1 consists of a fiber pair 3 comprised of two single mode fibers 3a and 3b. In the practice of the present invention, the fibers are selected such that the cores have slightly different indexes of refraction, one from the other. In these fibers, the core will also have a higher index of refraction than the cladding. Typically the fibers are conventional and are what are known as single mode fibers having an outer diameter at the cladding of 125 micron and a core diameter, for example in the case of fibers for use in the wavelength range of 400-600 nm, of typically 4 micron, in the case of a wavelength of about 800 nm, typically about 6 micron, and in the case of 1,300-1,500 nm, typically around 8-9 micron. For purposes of the invention, one fiber will have a core index of refraction different from the other. More specifically, assuming one index is set at 1.4627, the other index of refraction would be selected to fall within the range of about 1.4627-1.4636. In its most preferred aspect, the indexes would be set at about 1.4627 and 1.4636.

Figure 2A:
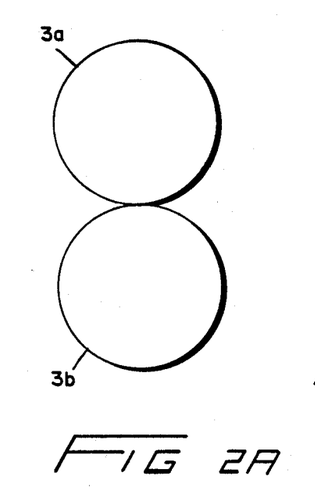
FIG. 2a-2c are, respectively, cross-sectional views of the coupler of FIG. 1 taken along lines AA, BB and CC.
Figure 2B:
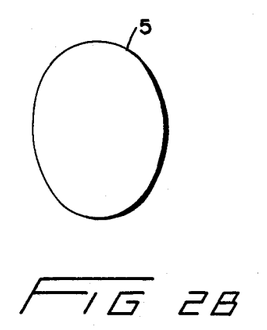
Figure 2C:
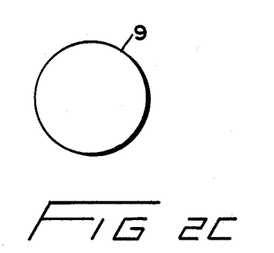

As shown in FIG. 1, the fibers are fused together as will be discussed hereinafter, in a manner such that form an initial fused region 5, they taper down at tapered portion 7 into a unitary fusion zone 9 of predetermined length wherein the cross-section is such, as shown in FIGS. 2a-2c, that one can no longer identify the discrete fibers 3a and 3b. Instead, as shown in FIG. 2c the unitary fusion zone 9 appears to be a discrete entity of predetermined length and of a substantially circular cross-section. Coupling occurs within this region 9, it is believed primarily by means of evanescent wave coupling which provides for uniform mode distribution between the two fibers. The cores of the two fibers pass through the reduced diameter zone 9.

Figure 3:
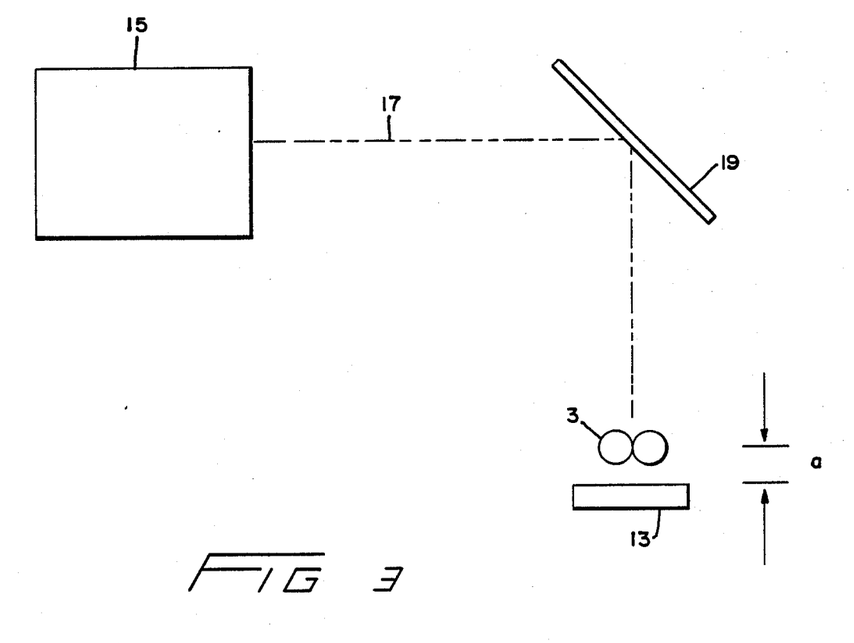
FIG. 3 is a schematic side view of a general coupler manufacturing arrangement in accordance with the invention.
Figure 4A:
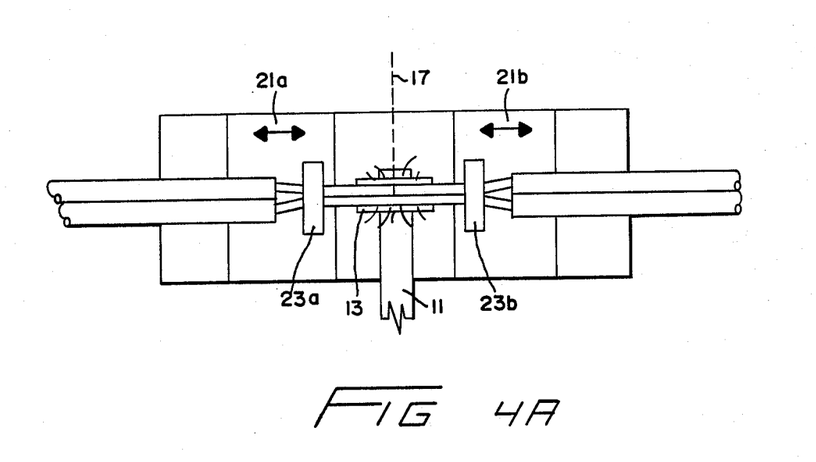
FIGS. 4a and 4b show generally a sequence of steps involved in the manufacture of the coupler in accordance with the invention.
Figure 4B:
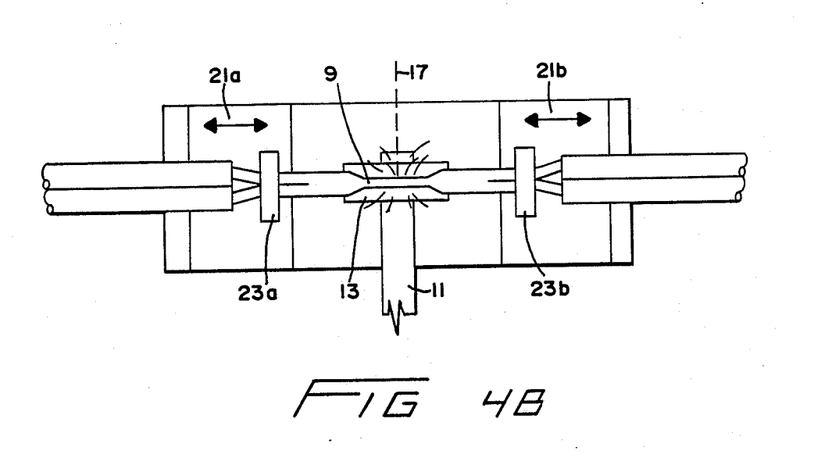
Figure 5A:
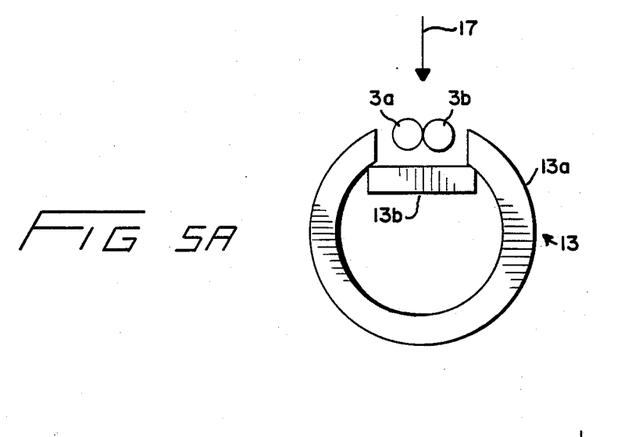
FIGS. 5a-5d show cross-sectional views of the structure of the ceramic member employed in the process of this invention.
Figure 5B:
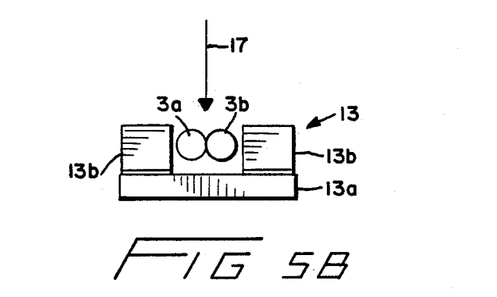
Figure 5C:
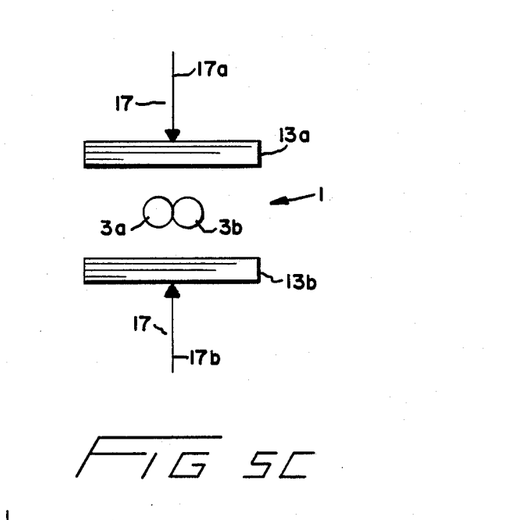
Figure 5D:
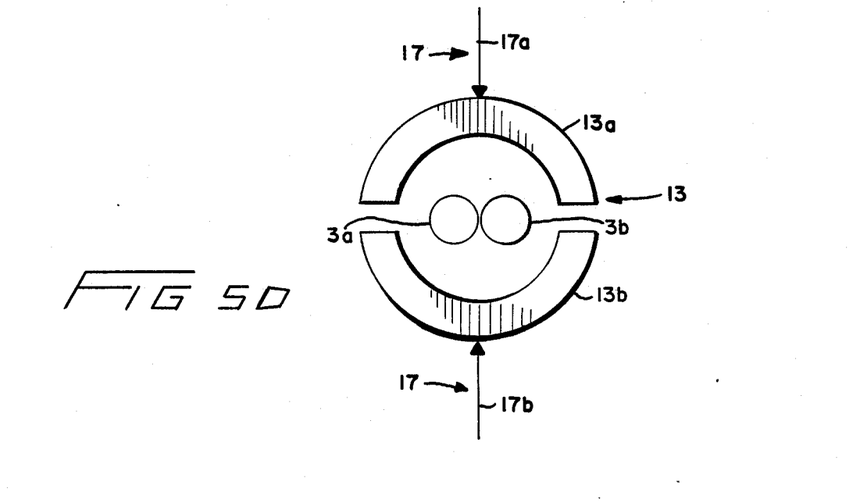

The device for manufacturing the coupler is generally shown in FIG. 3 as well as in FIGS. 4a and 4b. FIGS. 4a and 4b also generally show the steps involved in the manufacture of the coupler.

As shown in FIG. 3, the device for manufacturing the coupler generally includes a laser 15 which directs a laser beam 17 to a mirror 19 which redirects it onto the coupler pair 3. The beam passes through the coupler pair 3, which is spaced a predetermined distance of from a ceramic member 13. Heating of the ceramic member 13 occurs which in turn indirectly heats the coupler pair 3 to cause the fusing. All of the elements of the device are not shown in FIG. 3 and some have been omitted for the sake of clarity in illustration.

As shown in FIGS. 4a and 4b, initially the beam 17 passes through the coupler pair 3 and heats a ceramic member 13. The coupler pair is held together by gripper 23 and the ceramic member 13 is supported on a block 11. Sliding members 21, upon which the coupler pair of fibers 3a and 3b is held, are reciprocated in a back and forth motion over and through the ceramic member 13 to cause fusion or fusing of the fiber pair 3 over a predetermined length portion. As shown in FIG. 4b, once fusing of the fiber pair occurs, the sliding members 21 apply an axial tension outwardly to the fused pair to stretch the fibers and cause creation of a tapered region which projects into a predetermined length small diameter region 9 as shown in FIGS. 1 and 4b to result in the coupler. Throughput of light is measured while the coupler is being manufactured. When almost a state of desired coupling is reached, the process is terminated and the coupler allowed to cool and removed from the device.

Figure 6:
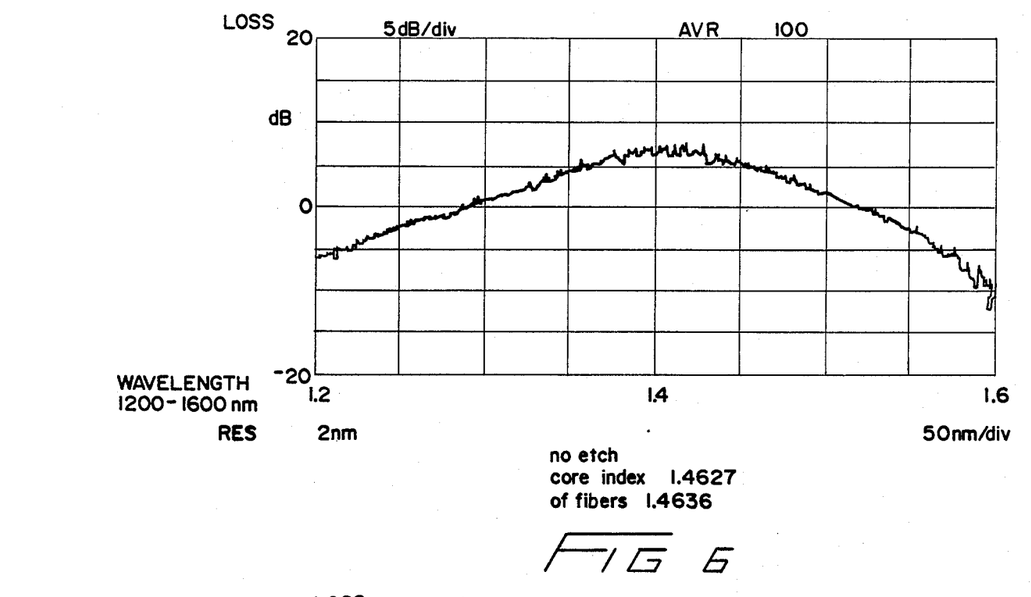
FIGS. 6-8 are graphs illustrating the coupling distribution of light in couplers in accordance with the invention, with FIGS. 6 and 7 showing the results when a minimal amount etching is performed on the fibers prior to fusing them into a coupler.
Figure 7:
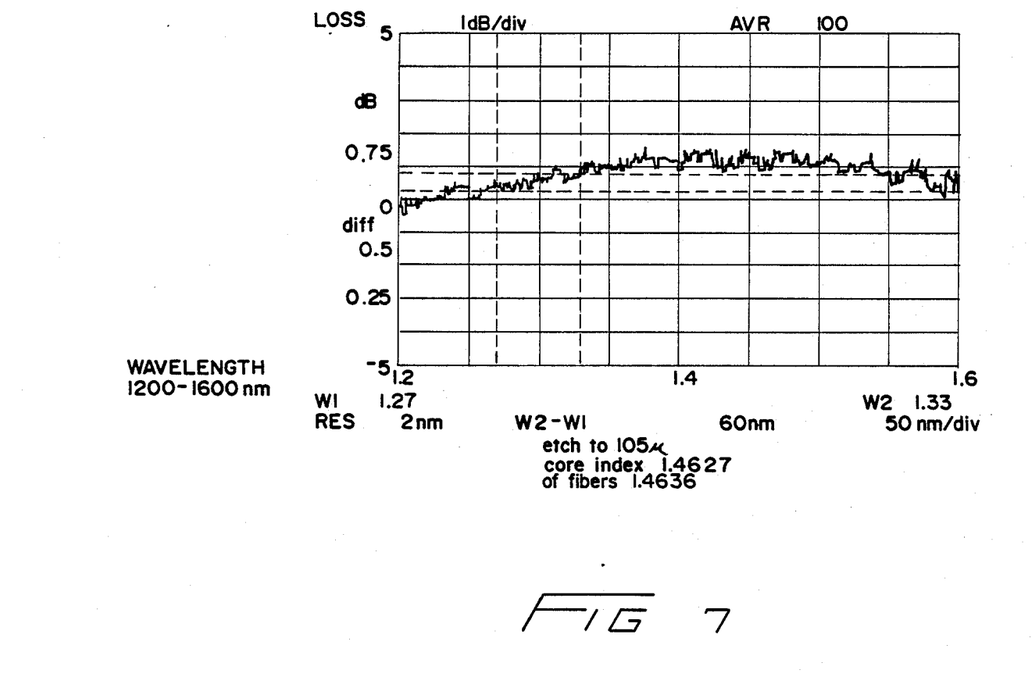
Figure 8:
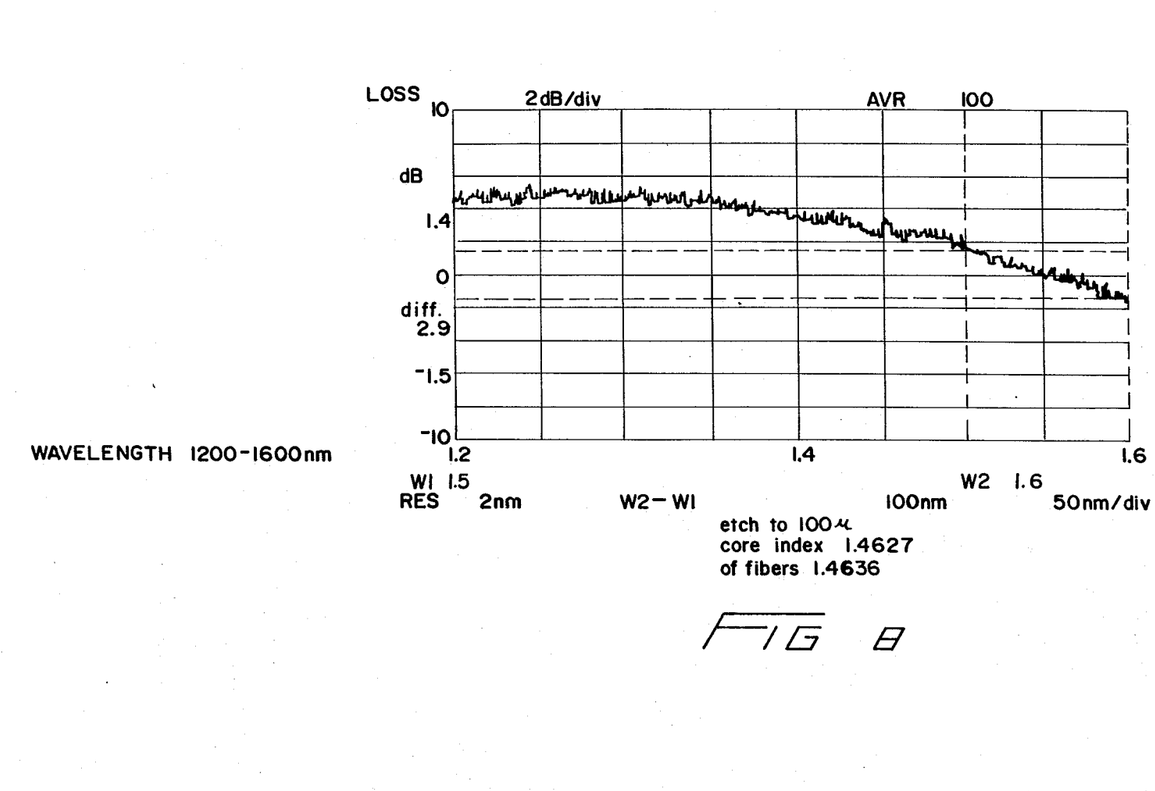
Figure 9A:
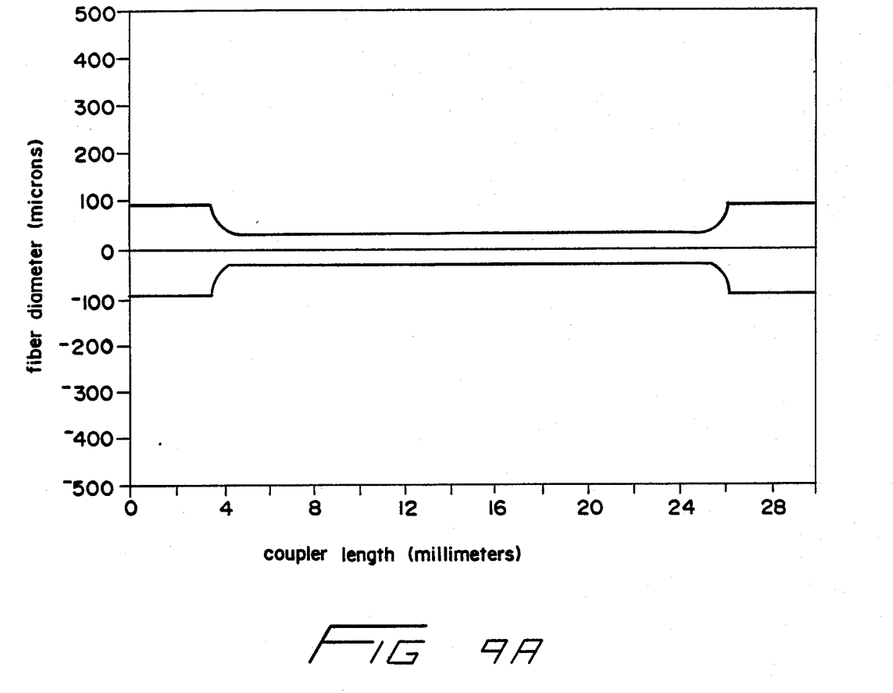
Figure 9B:
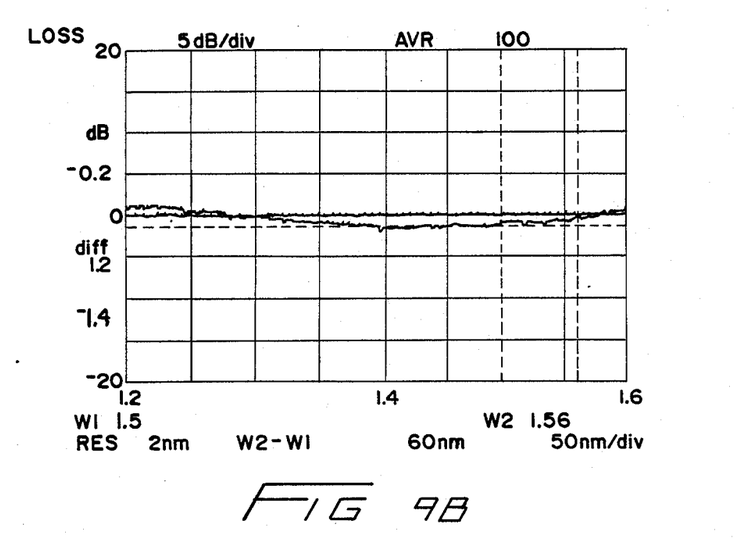
Figure 10A:
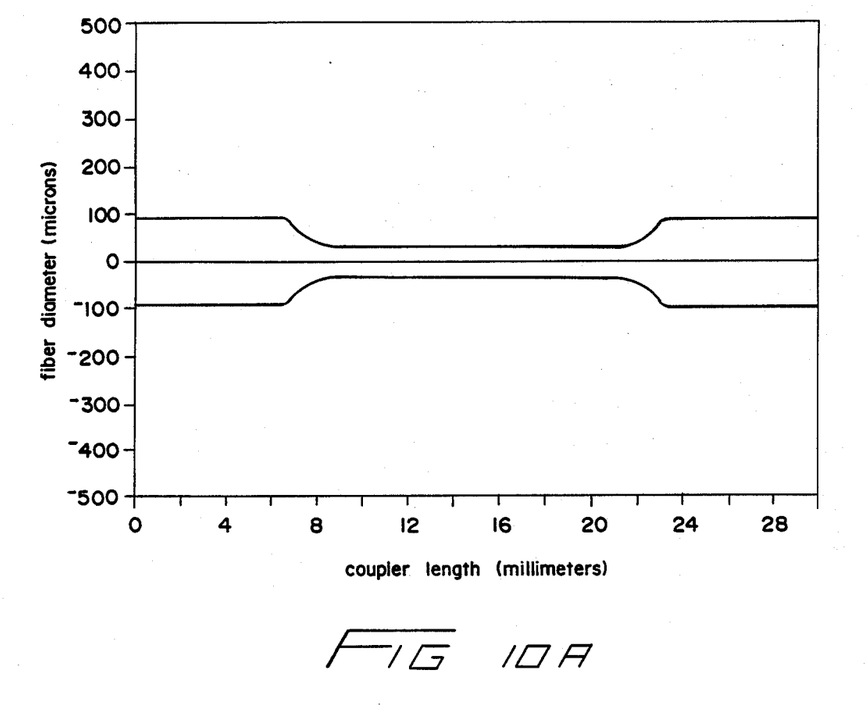
Figure 10B:
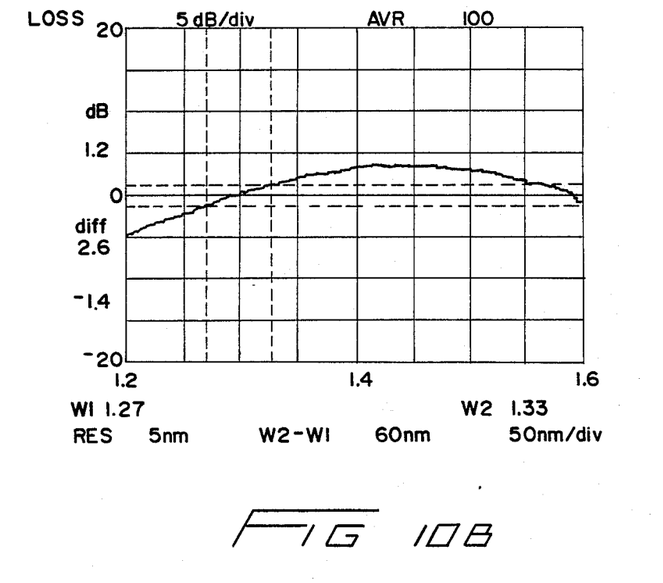

Actual experimental results as to coupling across a broad range of wavelengths is shown in the attached FIGS. 6-8. For purposes of testing, measurement of light distribution was conducted on couplers made from one fiber having a core index of a refraction of 1.4636 with the other fiber having a core index of refraction 1.4627. FIG. 6 shows the distribution along wavelengths ranging from 1,200 nm to 1,600 nm.

In one preferred aspect of the invention to improve coupling distribution, it is preferable to etch down the cladding to certain levels as shown in FIG. 7. Typically etching down to about 75-85 micron will give optimum results. However, as a trade off, since the smaller the fiber, the more difficult to handle, results of similar quality to 75-85 micron are achieved with etching to 100 micron, more preferably 105. Results in FIG. 7 are provided with cladding of the fibers etched down from an outer diameter of the fiber of 125 micron to a value of 105 micron. In FIG. 8 the results are shown with cladding etched down to 100 micron.

Alternatively, as shown in FIGS. 9a-10a, coupling performance can be achieved by varying coupler taper profile instead of etching.

As to the fibers themselves, these are preferably $SiO_2$ with the variations in index of refraction achieved conventionally by having doping of the cores, typically with $GeO_2$. Of course other equivalent and commercially available single mode fibers not limited to the above materials can be employed as will be readily apparent to those of ordinary skill in this art.

The foregoing description has set forth details of a preferred form of a single mode wavelength independent fiber coupler in accordance with the invention. Variations and alternative forms and all such changes and modifications as will be apparent to those of ordinary skill in the art, and which fall within the scope of the claims, are intended to be encompassed herein.

What is claimed is:

1. In a single mode coupler of type wherein two single mode fibers are fused together to form a coupler which permits substantially uniform coupling of light over a predetermined wavelength range of light between the two fibers, the improvement wherein said fibers are selected to have cores with respective indexes of refraction one different from the other, with the difference being sufficient such that when said fibers are fused together as a coupler, said substantially uniform coupling of light over a predetermined wavelength range, between the two fibers is achieved.

2. A coupler as in claim 1 wherein said fibers have an outer diameter at the edge of the cladding of about 125 micron and a core diameter of about 8 micron, the cladding and core being of glass and at least one of the cladding and core being doped to result in a fiber wherein the core has a higher index of refraction than the cladding.

3. A coupler as in claim 2 wherein said glass is $SiO_2$.

4. A coupler as in claim 3 wherein the $SiO_2$ core is doped with $GeO_2$ to achieve the difference in index of refraction between core and cladding.

5. A coupler as in claim 4 wherein the index of refraction of the cladding of the two fibers is about 1.46 and the index of refraction of the core of one of the fibers is about 1.4627 and of the other fiber is about 1.4636, and wherein the predetermined wavelength range of coupled light wavelengths is about 1200–1600 nm.

6. A coupler as in claim 2 wherein prior to fusing the fibers together the cladding of the fibers have been etched down such that the fibers have an outer diameter of no less than about 85–105 micron.

7. A coupler as in claim 3 wherein prior to fusing the fibers together the cladding of the fibers have been etched down such that the fibers have an outer diameter of no less than about 105 micron.

8. A coupler as in claim 4 wherein prior to fusing the fibers together the cladding of the fibers have been etched down such that the fibers have an outer diameter of no less than about 105 micron.

9. A coupler as in claim 5 wherein prior to fusing the fibers together the cladding of the fibers have been etched down such that the fibers have an outer diameter of no less than about 105 micron.

10. In a method of making a single mode coupler of the type wherein two single mode fibers are fused together forming a coupler which permits substantially uniform coupling of light over a predetermined wavelength range of light between the two fibers, the method of comprising the steps of positioning predetermined portions of the two single mode fibers together such that their claddings are in contact, heating the fibers with a heat source over a predetermined portion thereof and moving the predetermined portions in a reciprocal motion across and in proximity to the heat source to cause said predetermined portions of the fibers to fuse together, and applying axial tension to said fused region to taper down from individual fibers into a reduced diameter region of predetermined shape, wherein the fibers are fused into a unitary region, the improvement wherein the fibers to be fused are selected to have cores with respective indexes of refraction, one different from the other, with the difference being sufficient such that when said fibers are fused together as a coupler there results a coupler capable of uniformly coupling light over a predetermined wavelength range between the two fibers.

11. A method as in claim 10 wherein said fibers have an outer diameter at the edge of the cladding of about 125 micron and a core diameter of about 8 micron, the cladding and core being of glass and one of the cladding and core being doped to result in a fiber wherein the core has a higher index of refraction than the cladding.

12. A method as in claim 11 wherein said glass is $SiO_2$.

13. A method as in claim 12 wherein the $SiO_2$ core is doped with $GeO_2$ to achieve the difference in index of refraction between core and cladding.

14. A method as in claim 13 wherein the index of refraction of the cladding of the two fibers is about 1.46 and the index of refraction of the core of one of the fibers is about 1.4627 and of the other fiber is about 1.4636, and wherein the predetermined wavelength range of coupled light wavelengths is about 1200–1600 nm.

15. A method as in claim 11 wherein prior to fusing the fibers together the cladding of the fibers are etched down such that the fibers have an outer diameter of no less than about 105 micron.

16. A method as in claim 12 wherein prior to fusing the fibers together the cladding of the fibers are etched down such that the fibers have an outer diameter of no less than about 105 micron.

17. A method as in claim 13 wherein prior to fusing the fibers together the cladding of the fibers are etched down such that the fibers have an outer diameter of no less than about 105 micron.

18. A method as in claim 14 wherein prior to fusing the fibers together the cladding of the fibers are etched down such that the fibers have an outer diameter of no less than about 105 micron.

* * * * *